(12) United States Patent
Wu et al.

(10) Patent No.: US 7,459,684 B2
(45) Date of Patent: Dec. 2, 2008

(54) LONG-WAVELENGTH INFRA-RED NIGHT VISION GOGGLES

(75) Inventors: Pingfan Wu, Niskayuna, NY (US);
George Dalakos, Niskayuna, NY (US);
Peter Lorraine, Niskayuna, NY (US);
Brian Lawrence, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 377 days.

(21) Appl. No.: 11/132,789

(22) Filed: May 18, 2005

(65) Prior Publication Data
US 2008/0245966 A1 Oct. 9, 2008

(51) Int. Cl.
*G02F 1/01* (2006.01)
*H01L 25/00* (2006.01)

(52) U.S. Cl. ................... 250/330; 250/332
(58) Field of Classification Search ........... 250/330, 250/332
See application file for complete search history.

(56) References Cited

U.S. PATENT DOCUMENTS

| 4,751,571 | A |  | 6/1988 | Lillquist |  |
| 5,035,472 | A |  | 7/1991 | Hansen |  |
| 5,729,010 | A |  | 3/1998 | Pinkus et al. |  |
| 2002/0030163 | A1 | * | 3/2002 | Zhang | 250/330 |
| 2003/0102435 | A1 |  | 6/2003 | Myers et al. |  |
| 2004/0155186 | A1 | * | 8/2004 | Nestorovic et al. | 250/330 |
| 2004/0188617 | A1 |  | 9/2004 | Devitt et al. |  |
| 2006/0007250 | A1 | * | 1/2006 | Jung et al. | 345/690 |

FOREIGN PATENT DOCUMENTS

| GB | 1082022 | 9/1967 |
| WO | WO01/72033 A1 | 9/2001 |

OTHER PUBLICATIONS

"NVIS Compatibiity (A Primer)", URL/HTTP://WWW.BENTHAM.CO.UK/PDF/NVIS%20OMANUAL%20II.PDF, Bentham Instruments, Ltd.,(Feb. 28, 1997).

* cited by examiner

*Primary Examiner*—David P. Porta
*Assistant Examiner*—Mindy Vu
(74) *Attorney, Agent, or Firm*—Jeffrey D. Myers; Peacock Myers, P.C.; Timothy D. Stanley

(57) ABSTRACT

A night vision apparatus and method comprising employing a detector operating in the 7 to 14 microns wavelength region, converting via electronics and/or photonics the received light to the region visible to the human eye, and displaying the visible light on a display, wherein a housing contains the detector, the electronics and/or photonics, and the display.

20 Claims, 2 Drawing Sheets

LONG-WAVELENGTH INFRA-RED NIGHT VISION GOGGLES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to long-wavelength infra-red (IR) night vision goggles.

2. Description of Related Art

Current night vision devices are image intensification apparatuses that amplify the ambient visible light illumination view by a factor of 10 or more. As used in aircraft or other military applications, these devices usually take the form of goggles worn by the pilot. Night vision devices usually include a photocathode 12 that converts photons to electrons, a multiplier 14, and a phosphor screen 16 to convert electrons back into photons (FIGS. 1 and 2). Accordingly, typical night vision devices (or image intensifiers) only work with visible wavelengths of radiation. This type of prior art device is discussed in detail in *Bentham NVIS Compatibility (A Primer)*, Issue 2.01, Bentham Instruments Ltd. (February 1997).

Other existing devices image infrared (IR)/thermal radiation from objects in the dark. A typical device used is a charge coupled device (CCD) sensor that is sensitive in the IR.

A fused system (e.g., U.S. Pat. Nos. 4,751,571 and 5,035,472) has been used that combines both intensified visible and IR radiation. However, the IR radiation of such a system is confined only to the near IR region optimized to detect objects at very high temperatures of about 1000 degrees celsius. For temperatures of objects near room-temperature, maximum IR emission occurs within the "far-IR" region of 7 to 14 microns.

The present invention provides night vision goggles operating in the long wavelength IR region by employing an uncooled IR focal plane array (IRFPA).

BRIEF SUMMARY OF THE INVENTION

The present invention is of a night vision apparatus and method comprising: employing a detector operating in the 7 to 14 microns wavelength region; converting via electronics and/or photonics the received light to the region visible to the human eye; and displaying the visible light on a display; wherein a housing contains the detector, the electronics and/or photonics, and the display. In the preferred embodiment, the housing and its contents are formed as a pair of goggles, the detector comprises an IR focal plane array (more preferably wherein the IR focal plane array is uncooled and employs vanadium oxides), and the housing additionally contains one or more batteries powering one or more of the detector, the electronics and/or photonics, and the display. Focusing is accomplished by adjusting the distance between a lens and the detector. An optical limiter is used to protect the detector against sudden increases in object temperature. An electrical limiter is used to protect the human eye so that sudden environmental temperature variation displays as a more gradual change. A merge prism can be employed to combine both the IR image and a visible image. The invention permits a user to distinguish a non-fluorescent, non-phosphorescent ink from a substrate of a different material in the absence of visible light.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of night vision goggles employing long wavelength infrared (IR) detection. The invention is equally useful in military and non-military applications. The goggles of the invention employ an uncooled IR focal plane array, so it is compact and can be worn by a person. The goggles sense long wavelength IR (room-temperature) heat information, and so it works without any need for compatible lighting. In the display, a lens matches the human eye so that a person comfortably perceives the image as coming from infinity.

Figure 1:
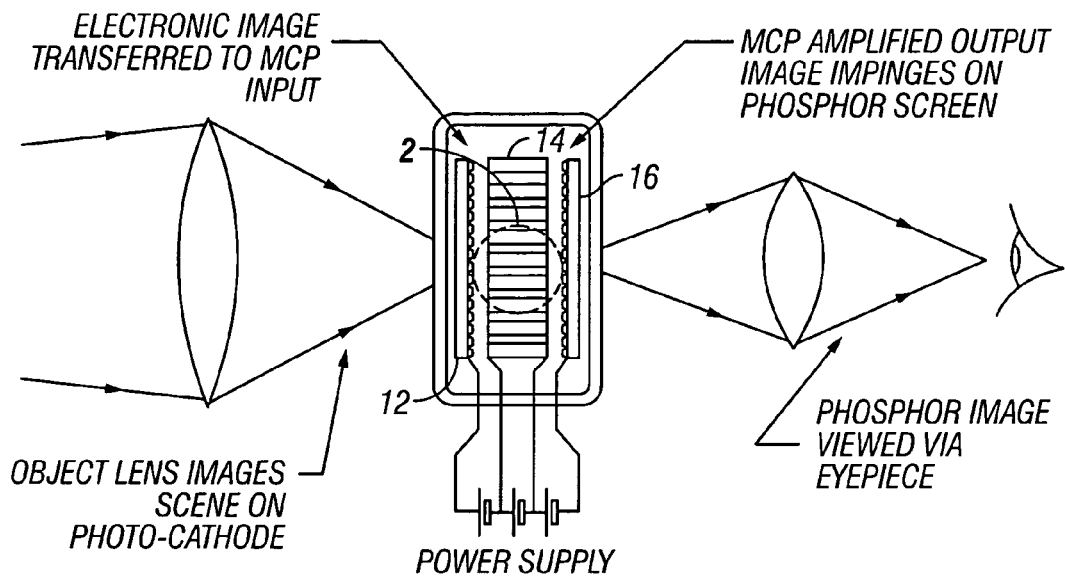
FIG. 1 is a schematic diagram of a prior art night vision goggle configuration operating in the visible region.
Figure 2:
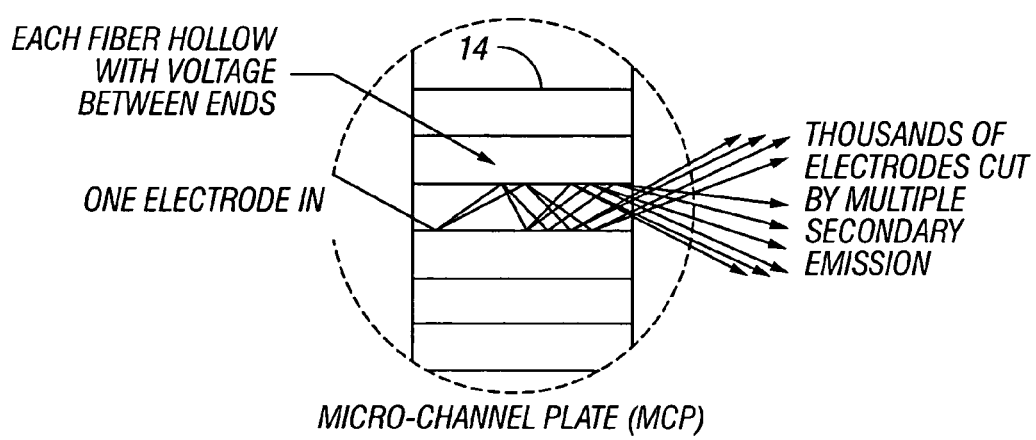
FIG. 2 is a schematic diagram showing operation of the micro-channel plate component of prior art systems as in FIG. 1.
Figure 3:
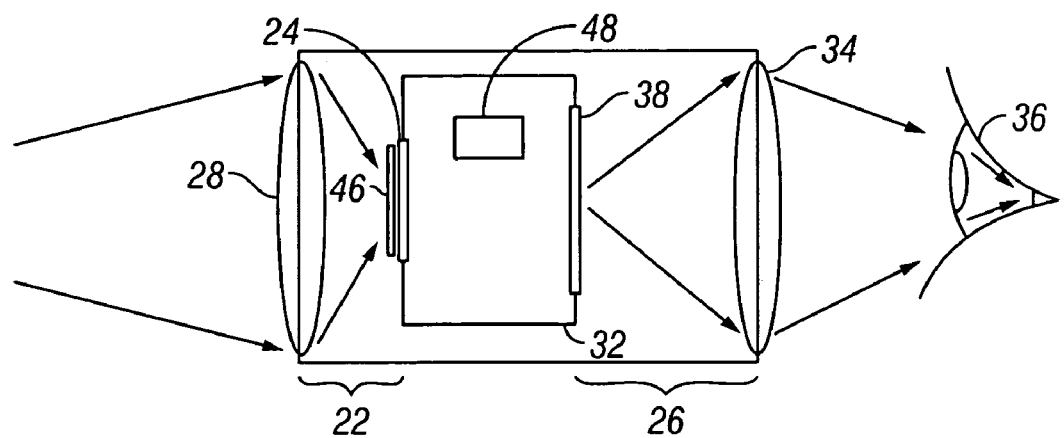
FIG. 3 is a schematic diagram of the long wavelength IR night vision goggles of the present invention.

Referring to FIG. 3, the night vision goggles 20 of the invention preferably have two main parts: An imaging system 22 that captures the environmental body temperature to a detector array 24 operating at 7 to 14 microns (long wavelength IR region); and a display system 26 that shows the image to the eye/s 36 in such a way that human eye perceives the image as the eye seeing the surrounding objects directly. A lens L1 28 images the 7 to 14 micron wavelength (heat) information to an IR focal plane array 24 (IRFPA), preferably uncooled so as to operate at room temperature. One example of an IRFPA suitable for use with the invention is a bolometer type uncooled array based on vanadium oxides (vanadium oxide is useful for detection and/or optical limiting). The IRFPA array preferably has dimension of 320 by 240 or 640 by 480 pixels, with pixel pitch preferably approximately 25 microns. One example of a lens useful with the invention is a germanium lens, preferably coated with antireflection coating. The typical focal length of the lens is approximately 50 mm, which is the same as that of the human eye. Electronics and/or photonics 32 reads the IR image from the IRFPA and converts it to visible signals for display. One example of a display device useful in the display system of the invention is a liquid-crystal device 38 (LCD), whose pixels are preferably modulated by the grayscale from the corresponding pixels on IRFPA. The visible light's polarization is preferably modulated by the pixels on the LCD, so that it can display the information collected by the IRFPA. After the display system, a lens L2 34 preferably displays the image to the human eye, which has its own f=50 mm lens. Lens L2 collimates the displayed light, which can be perceived as coming from infinity. In this arrangement, the eye feels comfortable and relaxed in looking at the IR information. The human eye can focus at various depths. With the goggles, one can preferably be able to adjust the distance between lens L1 and IRFPA to achieve focusing. The focusing can be adjusted by manually changing the position of lens L1 or automatically focusing by sensing the curvature of the human eye lens, as with a single lens reflex (SLR) camera eye tracking mechanism.

Figure 4:
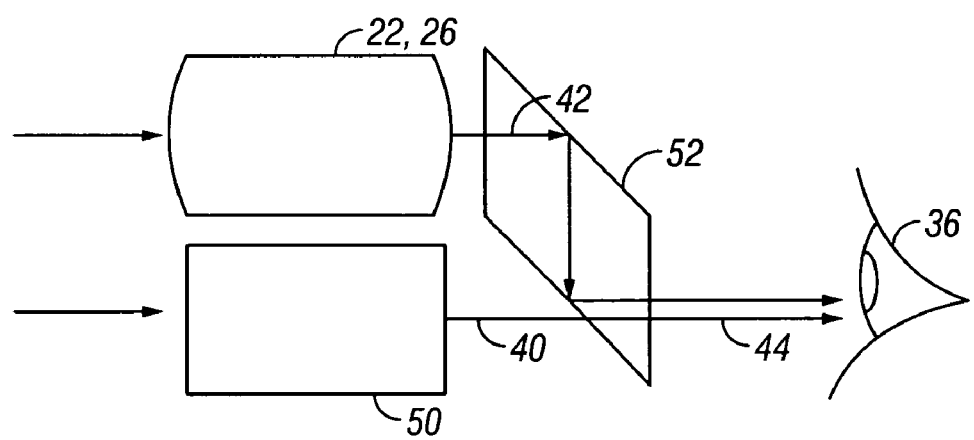
FIG. 4 is a schematic diagram of the Image combiner employed by the present invention to combine the long wavelength IR and visible images into a single image to be displayed to the user.

The invention also preferably employs two limiting mechanisms for protection: An optical limiter 46 to protect the detector against strong light suddenly turning on; and an electrical limiter 48 to protect human vision by gradually displaying an unexpected change. In another embodiment, one overlaps 44 both the visible 40 and IR 42 images (FIG. 4). The visible image can either come from a night vision image intensifier 50 or directly from the object under weak illumination. This is preferably accomplished by a folding prism image combiner 52. The goggles of the invention preferably have two sets of detecting and display units for two eyes, just like regular goggles, which permits one to perceive depth information.

Unlike image-intensifying night vision goggles, which still require visible illumination, the long-wavelength IR goggle of the invention can image objects at room temperature, without any visible illumination. Special compatible lighting is not required. The long-wavelength IR goggle can work at complete darkness. For military and/or security applications, the IR camera can see something that is invisible to the human eye. Compared to cooled IR cameras, the uncooled IRFPA is simpler, lighter, and more compact. The IR detecting and display unit can be arranged in a package of approximately one inch in diameter and less than two inches long. Therefore, the present invention can easily be built as a goggles apparatus and powered by a battery. The invention can be used also to distinguish in the dark an ink from a substrate (e.g., a label) on which the ink is printed, enabling reading in the dark. For example, metallic ink can be used on a plastic bottle or an organic ink on a metallic bottle.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. Night vision apparatus comprising:
  a detector operating in the 7 to 14 microns wavelength region;
  electronics and/or photonics converting the received light to the region visible to the human eye;
  a display displaying the visible light;
  an optical limiter;
  an electrical limiter that protects the human eye so that sudden environmental temperature variation displays as a more gradual change; and
  a housing containing said detector, said electronics and/or photonics, said optical limiter, said electrical limiter, and said display.

2. The apparatus of claim 1 formed as a pair of goggles.

3. The apparatus of claim 1 wherein said detector comprises an IR focal plane array.

4. The apparatus of claim 3 wherein said IR focal plane array is uncooled.

5. The apparatus of claim 3 wherein said IR focal plane array employs vanadium oxides.

6. The apparatus of claim 1 wherein said housing additionally contains one or more batteries powering the apparatus.

7. The apparatus of claim 1 wherein focusing is achieved by adjusting the distance between a lens and said detector.

8. The apparatus of claim 1 wherein said optical limiter comprises a passive optical limiter to protect said detector against sudden increases in object temperature.

9. The apparatus of claim 1 additionally comprising a merge prism combining both the IR image and a visible image.

10. The apparatus of claim 1 capable of distinguishing a non-fluorescent, non-phosphorescent ink from a substrate of a different material in the absence of visible light.

11. A night vision method comprising the steps of:
  employing a detector operating in the 7 to 14 microns wavelength region;
  converting via electronics and/or photonics the received light to the region visible to the human eye;
  displaying the visible light on a display;
  employing an optical limiter to protect the detector;
  employing an electrical limiter that protects the human eye so that sudden environmental temperature variation displays as a more gradual change; and
  wherein a housing contains the detector, the electronics and/or photonics, the optical limiter, the electrical limiter, and the display.

12. The method of claim 11 wherein the housing and its contents are formed as a pair of goggles.

13. The method of claim 11 wherein the detector comprises an IR focal plane array.

14. The method of claim 13 wherein the IR focal plane array is uncooled.

15. The method of claim 13 wherein the IR focal plane array employs vanadium oxides.

16. The method of claim 11 wherein the housing additionally contains one or more batteries powering one or more of the detector, the electronics and/or photonics, and the display.

17. The method of claim 11 additionally comprising the step of focusing by adjusting the distance between a lens and the detector.

18. The method of claim 11 wherein the optical limiter step comprises employing passive optical limiter to protect the detector against sudden increases in object temperature.

19. The method of claim 11 additionally comprising the step of employing a merge prism to combine both the IR image and a visible image.

20. The method of claim 11 additionally comprising the step of permitting a user to distinguish a non-fluorescent, non-phosphorescent ink from a substrate of a different material in the absence of visible light.

* * * * *